United States Patent [19]

Jordine et al.

[11] Patent Number: 5,630,851
[45] Date of Patent: May 20, 1997

[54] PROCESS FOR TRICHROMATIC DYEING OR PRINTING

[75] Inventors: Guido Jordine, Freiburg, Germany; Jean-Marie Adam, Rosenau, France

[73] Assignee: Ciba-Geigy Corporation, Tarrytown, N.Y.

[21] Appl. No.: 609,217

[22] Filed: Mar. 1, 1996

Related U.S. Application Data

[63] Continuation of Ser. No. 353,836, Dec. 12, 1994, abandoned.

[30] Foreign Application Priority Data

Dec. 16, 1993 [CH] Switzerland .............. 3766/93

[51] Int. Cl.$^6$ ................ D06P 3/16; D06P 3/24
[52] U.S. Cl. ............ 8/641; 8/643; 8/917; 8/924; 8/683; 8/676
[58] Field of Search .............. 8/639, 641, 643, 8/917, 924, 683, 676

[56] References Cited

U.S. PATENT DOCUMENTS

| | | | |
|---|---|---|---|
| 4,060,383 | 11/1977 | Ridyard | 8/41 |
| 4,075,200 | 2/1978 | Ridyard | 260/206 |
| 5,092,905 | 3/1992 | Daré | 8/638 |
| 5,094,665 | 3/1992 | Mäusezahl | 8/641 |
| 5,131,919 | 7/1992 | Mäusezahl | 8/643 |
| 5,234,467 | 8/1993 | Schartzer | 8/641 |

FOREIGN PATENT DOCUMENTS 1454475  11/1976  United Kingdom .

OTHER PUBLICATIONS

Chem. Abst. 100(26) 211638k of PL119756 30 Nov. 1983.
Chem. Abst. 100(26) 211637j of PL119751 30 Nov. 1983.

*Primary Examiner*—Margaret Einsmann
*Attorney, Agent, or Firm*—Kevin T. Mansfield

[57] ABSTRACT

A process for dyeing or printing polyamide material by the trichromatic technique using a dye mixture which contains least two yellow- or orange-dyeing dyes of formula (1)

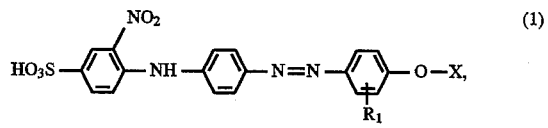

wherein $R_1$ is hydrogen, $C_1$–$C_4$alkyl, $C_1$–$C_4$alkoxy or halogen, and X is hydrogen or $C_1$–$C_4$alkyl; together with at least one red-dyeing dye of formulae (2) and (3)

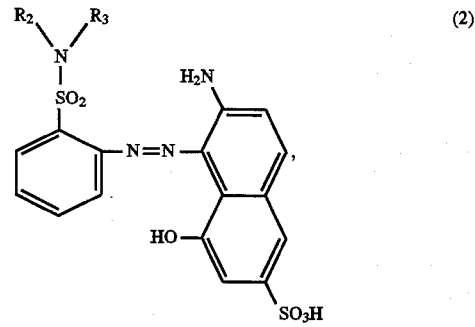

wherein $R_2$ is $C_1$–$C_6$alkyl, phenyl or cyclohexyl and $R_3$ is $C_1$–$C_6$alkyl, or wherein $R_2$ and $R_3$, together with the linking nitrogen atom, form an azepinyl ring, and $R_4$ is hydrogen, $C_2$–$C_4$alkanoylamino or halogen; and together with at least one of the blue-dyeing dyes of formulae (4) and (5)

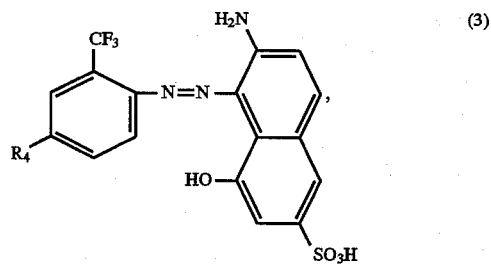

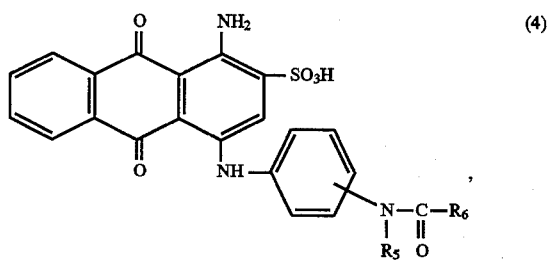

wherein $R_5$ is hydrogen or $C_1$–$C_4$alkyl, $R_6$ is $C_1$–$C_4$alkyl or amino, $R_7$ is hydrogen or methyl, and $R_8$ is a $C_{2-4}$hydroxyalkylsulfamoyl radical, is disclosed.

10 Claims, No Drawings

PROCESS FOR TRICHROMATIC DYEING OR PRINTING

This application is a continuation of application Ser. No. 08/353,836 filed Dec. 12, 1994, abandoned.

The present invention relates to a process for dyeing or printing natural or synthetic polyamide fibre materials by the trichromatic technique.

It is the object of this invention to provide a process for dyeing or printing natural or synthetic polyamide fibre materials with dyes suitable for combination dyeing by the trichromatic technique.

It has now been found that this object can be achieved by the inventive process described hereinafter. The dyeings so obtained meet the above requirements and are distinguished in particular by uniform colour build-up, while at the same time having consistency of shade at different concentrations of dyes and good compatibility on the dyed material.

Accordingly, the present invention relates to a process for dyeing or printing natural or synthetic polyamide fibre materials by the trichromatic dyeing technique, which comprises using a dye mixture of at least two yellow- or orange-dyeing dyes of formula (1)

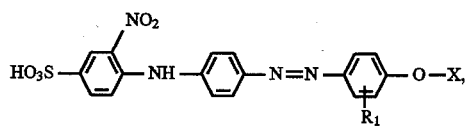

wherein $R_1$ is hydrogen, $C_1$–$C_4$alkyl, $C_1$–$C_4$alkoxy or halogen, and X is hydrogen or $C_1$–$C_4$alkyl; together with at least one red-dyeing dye of formulae (2) and (3)

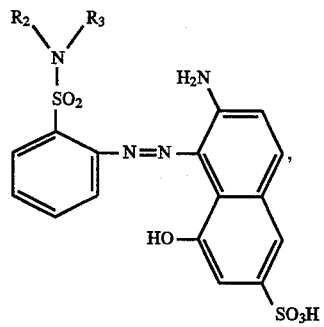

wherein $R_2$ is $C_1$–$C_6$alkyl, phenyl or cyclohexyl and $R_3$ is $C_1$–$C_6$alkyl, or wherein $R_2$ and $R_3$, together with the linking nitrogen atom, form an azepinyl ring,

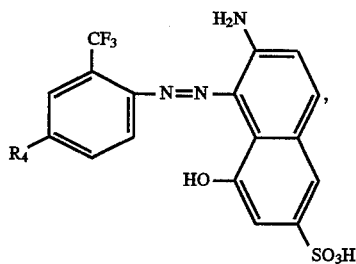

wherein $R_4$ is hydrogen, halogen or $C_2$–$C_4$alkanoylamino; and, together with at least one of the blue-dyeing dyes of formulae (4) and (5)

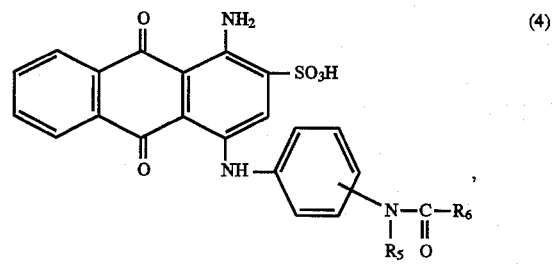

wherein $R_5$ is hydrogen or $C_1$–$C_4$alkyl, and $R_6$ is $C_1$–$C_4$alkyl or amino,

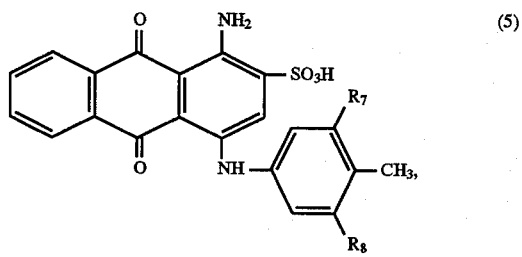

wherein $R_7$ is hydrogen or methyl, and $R_8$ is a $C_{2-4}$hydroxyalkylsulfamoyl radical.

By the trichromatic technique is meant the additive blending of suitably chosen yellow or orange, red or blue-dyeing dyes with which each desired shade of the visible colour spectrum may be adjusted by appropriate choice of the quantity ratios.

X, $R_1$, $R_5$ and $R_6$ defined as $C_1$–$C_4$alkyl may suitably be methyl, ethyl, propyl, isopropyl, butyl, isobutyl, sec-butyl or tert-butyl, preferably methyl or ethyl. Methyl is most preferred.

$R_2$ and $R_3$ defined as $C_1$–$C_6$alkyl may suitably be methyl, ethyl, propyl, isopropyl, butyl, isobutyl, sec-butyl, tert-butyl or straight-chain or branched pentyl or hexyl. Methyl and ethyl are preferred. Also preferred are the radicals of formulae —(CH$_2$)$_3$—CH$_3$, —(CH$_2$)$_4$—CH$_3$, —CH(CH$_3$)—C$_2$H$_5$, —CH(CH$_3$)$_2$ and —CH$_2$—CH(CH$_3$)$_2$, more particularly methyl or ethyl and, most preferably, methyl.

$R_1$ defined as $C_1$–$C_4$alkoxy may suitably be methoxy, ethoxy, propoxy, isopropoxy, butoxy, sec-butoxy, isobutoxy or tert-butoxy, preferably methoxy.

$R_4$ defined as $C_2$–$C_4$alkanoylamino may suitably be propionylamino or, preferably, acetylamino.

Halogen substituents $R_1$ and $R_4$ are conveniently fluoro or bromo and, preferably, chloro.

If $R_2$ and $R_3$, together with the linking nitrogen atom, form an azepinyl ring, then said ring is a radical of formula

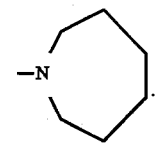

$R_8$ defined as $C_{2-4}$hydroxyalkylsulfamoyl radical is preferably a radical of formula —SO$_2$—NH—CH$_2$—CH$_2$—OH.

$R_1$ is preferably hydrogen, $C_1$–$C_4$alkyl, more particularly methyl or $C_1$–$C_4$alkoxy and, most preferably, methoxy. More particularly, $R_1$ is hydrogen or $C_1$–$C_4$alkyl and, most preferably, hydrogen or methyl.

X is preferably hydrogen or methyl. Hydrogen is most preferred.

Typical examples of individual components of the mixtures of dyes of formula (1) are the dyes of formulae

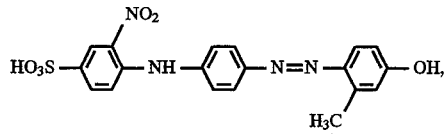 (6)

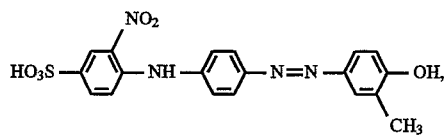 (7)

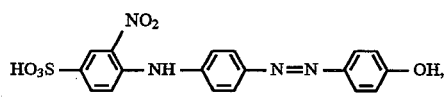 (8)

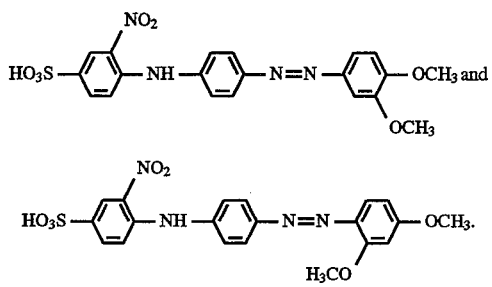 (9)

(10)

$R_2$ is preferably a radical of formula —$(CH_2)_3$—$CH_3$, —$(CH_2)_4$—$CH_3$, —$CH(CH_3)$—$C_2H_5$, —$CH(CH_3)_2$ or —$CH_2$—$CH(CH_3)_2$ or, more particularly, is phenyl or cyclohexyl. $R_2$ is most preferably cyclohexyl.

$R_3$ is preferably methyl or ethyl or a radical of formula —$(CH_2)_3$—$CH_3$, —$(CH_2)_4$—$CH_3$, —$CH(CH_3)$—$C_2H_5$, —$CH(CH_3)_2$ or —$CH_2$—$CH(CH_3)_2$, more particularly methyl or ethyl. $R_3$ is most preferably methyl.

Furthermore, $R_2$ and $R_3$, together with the linking nitrogen atom, may form an azepinyl ring.

$R_4$ is preferably hydrogen or chloro.

$R_5$ is preferably hydrogen, methyl or ethyl, most preferably hydrogen.

$R_6$ is preferably $C_1$-$C_4$alkyl, more particularly methyl or ethyl. Methyl is preferred.

$R_7$ is preferably methyl.

For the mixtures of yellow- or orange-dyeing dyes it is preferred to use those dyes of formula (1), wherein $R_1$ is hydrogen or $C_1$-$C_4$alkyl, preferably hydrogen or ethyl, and X is hydrogen.

Particularly preferred mixtures of yellow- or orange-dyeing dyes of formula (1) are those consisting of at least two dyes of formulae (6), (7) and (8).

Particularly important mixtures of yellow- or orange-dyeing dyes of formula (1) are those wherein one component is a dye of formula (6). Of particular interest are mixtures of a dye of formula (6) with at least one of the dyes of formulae (7) to (10), preferably at least one of the dyes of formulae (7) and (8). Mixtures of yellow- or orange-dyeing dyes of formula (1) comprising one dye of formula (6) and one dye of formula (8) are of very important interest.

It is preferred to use red-dyeing dyes of formula (2), wherein $R_2$ is a radical of formula —$(CH_2)_3$—$CH_3$, —$(CH_2)_4$—$CH_3$, —$CH(CH_3)$—$C_2H_5$, —$CH(CH_3)_2$ or —$CH_2$—$CH(CH_3)_2$ or, preferably, phenyl or cyclohexyl, and $R_3$ is methyl or ethyl or a radical of formula —$(CH_2)_3$—$CH_3$, —$(CH_2)_4$—$CH_3$, —$CH(CH_3)$—$C_2H_5$, —$CH(CH_3)_2$ or —$CH_2$—$CH(CH_3)_2$, preferably methyl or ethyl, or wherein $R_2$ and $R_3$, together with the linking nitrogen atom, form an azepinyl ring.

It is particularly preferred to use red-dyeing dyes of formula (2), wherein $R_2$ is cyclohexyl and $R_3$ is methyl, or wherein $R_2$ and $R_3$, together with the linking nitrogen atom, form an azepinyl ring and, preferably, those wherein $R_2$ is cyclohexyl and $R_3$ is methyl.

Preferred red-dyeing dyes are those of formula (2) which have the meanings and preferred meanings defined above.

It is preferred to use blue-dyeing dyes of formula (4), wherein the radical of formula —$N(R_5)$—$CO$—$R_6$ is in meta- or para-position, preferably in meta-position, relative to the amino group. $R_5$ is preferably hydrogen, and $R_6$ is methyl or ethyl, most preferably methyl.

It is particularly preferred to use blue-dyeing dyes of formula (5), wherein $R_7$ is methyl and $R_8$ is a radical of formula —$SO_2$—$NH$—$CH_2$—$CH_2$—$OH$.

Preferred blue-dyeing dyes for the process of this invention are the dye of formula (4) or a mixture of the dye of formula (4) with a a dye of formula (5). $R_5$ is preferably hydrogen, $R_6$ is methyl or ethyl, and $R_8$ is a radical of formula —$SO_2$—$NH$—$CH_2$—$CH_2$—$OH$.

Accordingly, the dye of formula (4) may be used without the simultaneous presence of the dye of formula (5) or in admixture with the dye of formula (5).

Particularly suitable mixtures of the dyes of formulae (4) and (5) are those wherein $R_5$ is hydrogen, $R_6$ is methyl or, more particularly, ethyl. $R_7$ is methyl, and $R_8$ is a radical of formula —$SO_2$—$NH$—$CH_2$—$CH_2$—$OH$.

Mixtures of dyes of formula (4), wherein $R_6$ is an alkyl radical, are also of interest.

A preferred embodiment of this invention comprises using as red-dyeing dye a dye of formula (2), wherein $R_2$ is cyclohexyl and $R_3$ is methyl or wherein $R_2$ and $R_3$, together with the linking nitrogen atom, form an azepinyl ring, and, as blue-dyeing dye, a dye of formula (4) or a mixture of the dye of formula (4) with a dye of formula (5), wherein $R_5$ is hydrogen, $R_6$ is methyl or ethyl, and $R_8$ is a radical formula —$SO_2$—$NH$—$CH_2$—$CH_2$—$OH$. The mixtures of yellow- or orange-dyeing dyes of formula (1) have the meanings and preferred meanings defined above. Such mixtures are preferably a mixture consisting of the dye of formula (6) and one of the dyes of formulae (7) and (8) and, most preferably, a mixture of the dye of formula (6) and (8). The meanings and preferred meanings given above also apply to the blue- and red-dyeing dyes. As blue-dyeing dyes it is particularly preferred to use mixtures comprising the dye of formula (4) together with a dye of formula (5), wherein $R_8$ is hydrogen, $R_6$ is methyl or, preferably, ethyl, $R_7$ is methyl, and $R_8$ is a radical of formula —$SO_2$—$NH$—$CH_2$—$CH_2$—$OH$.

A very particularly preferred embodiment of the process of the inventive process comprises not using an additional yellow- or orange-dyeing dye besides the dyes of formula (1).

The invention further relates to dye mixtures comprising a mixture of yellow- or orange-dyeing dyes of formula (1) together with at least one of the red-dyeing dyes of formulae (2) and (3) and at least one of the blue-dyeing dyes of formula (4) and (5). The dye mixtures of the dyes of formula (1), and the dyes of formulae (2), (3), (4) and (5) have the meanings and preferred meanings defined above.

The invention also relates to azo dyes of formula

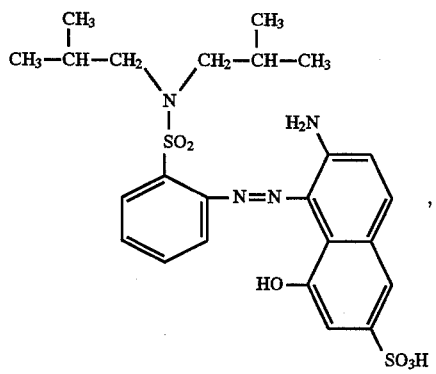

(11)

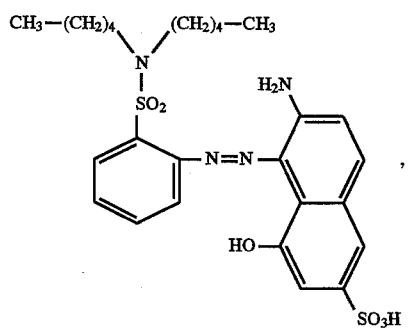

(12)

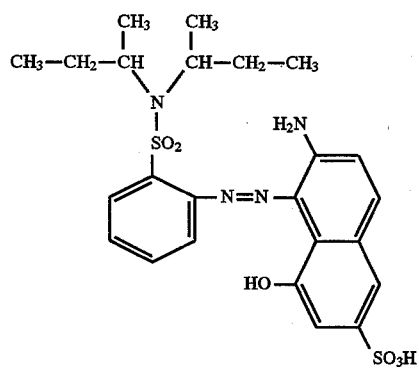

(13)

or

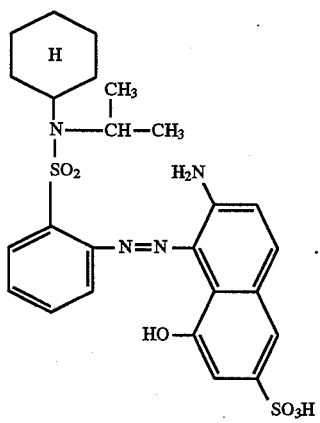

(14)

The invention also relates to a process for the preparation of the azo dyes of formulae (11) to (14), which comprises diazotising a compound of formula

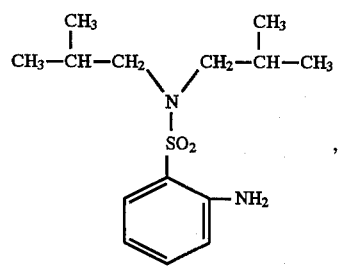

(15)

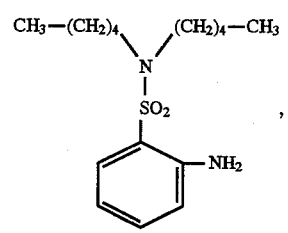

(16)

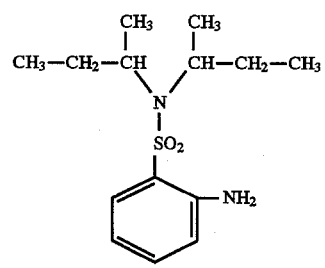

(17)

or

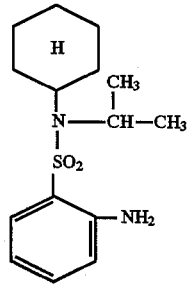

(18)

and coupling the diazonium salt so obtained to a coupling component of formula

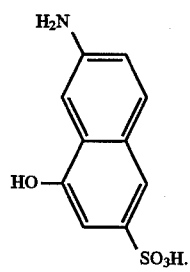

(19)

The diazotisation of the compounds of formulae (15) to (18) is effected in a manner known per se, typically with a nitrite, for example with an alkali metal nitrite such as sodium nitrite, and in a medium containing mineral acid, conveniently hydrochloric acid, in the temperature range from −5° to 30° C., preferably from 0° to 10° C.

The coupling to the coupling component of formula (19) is carded out in a manner known per se in the acid, neutral or weakly alkaline pH range and in the temperature range from −5° to 30° C., preferably 0° to 25° C.

The compounds of formulae (15) to (18) and the compound of formula (19) are known or may be prepared in general accordance with procedures for obtaining known dyes. Accordingly, the compounds of formulae (15) to (18) can be obtained by reacting a compound of formula

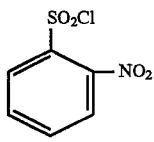 (20)

with the corresponding amines and then reducing the nitro group to the amino group. The reaction of the compound of formula (20) with the amines and the subsequent reduction of the nitro group is carded out in general accordance with known processes.

The further dyes of formulae (1), (2), (3), (4) and (5) employed in the novel process for trichromatic dyeing or printing are known or may be prepared by methods analogous to known ones. Accordingly, the dyes of formula (1) may be obtained in accordance with the process disclosed in U.S. Pat. No. 4,060,383 and in GB-A-1 454 475.

The dyes employed in the novel process for trichromatic dyeing or printing are either in the form of their free sulfonic acids or, preferably, in the form of their salts.

Examples of suitable salts are the alkali metal salts, alkaline earth metal salts or ammonium salts, or the salts of an organic amine. Typical examples are the sodium, lithium, potassium or ammonium salts or the salt of mono-, di- or triethanolamine.

The dyes employed in the process of this invention may contain further auxiliaries, such as sodium chloride or dextrin.

The trichromatic dyeing or printing process of this invention is susceptible of application to conventional dyeing or printing methods. In addition to containing water and the dyes, the dye liquors or printing pastes may contain further auxiliaries, for example wetting agents, antifoams, levelling agents or agents which influence the property of the textile materials, e.g. softeners, flameproofing additives, or dirt, water and oil repellents, as well as water softeners and natural or synthetic thickeners, e.g. alginates and cellulose ethers.

The novel process for trichromatic dyeing or printing is also suitable for dyeing from short liquors, e.g. in continuous dyeing or in batchwise or continuous foam dyeing processes.

In trichromatic dyeing or printing, the dyes employed in the process of this invention are distinguished by level colour build-up, good exhaustion properties, good consistency of shade even at different concentrations, good fastness properties and solubility and, in particular, by very good compatibility.

The novel process for trichromatic dyeing or printing is suitable for dyeing or printing natural polyamide material, e.g. wool, and also, in particular, synthetic polyamide material, e.g. polyamide 6 or polyamide 66, and is suitable for dyeing or printing wool and synthetic polyamide blends and yarns.

The textile material may be in any form of presentation, e.g. in the form of fibre, yarn, wovens or knits and, in particular, of carpets.

The dyeings obtained are level and have good allround fastness properties, in particular good fastness to rubbing, wet rubbing and light.

In the following Examples, parts are by weight. The relationship between parts by weight and parts by volume is the same as that between the gram and the cubic centimeter.

EXAMPLE 1

1 part of a levelling agent (based on the condensate of a higher aliphatic amine and ethylene oxide) is added to 2000 parts of demineralised water at room temperature. The bath is then adjusted to pH 6 with acetic acid. To this bath is then added a mixture of 0.11 part of a dye which, in the form of the free acid, corresponds to the compound of formula

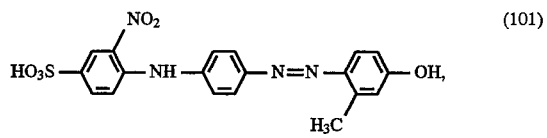 (101)

0.11 part of a dye which, in the form of the free acid, corresponds to the compound of formula

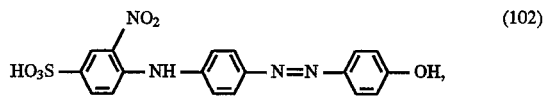 (102)

0.1 part of the dye which, in the form of the free acid, corresponds to the compound of formula

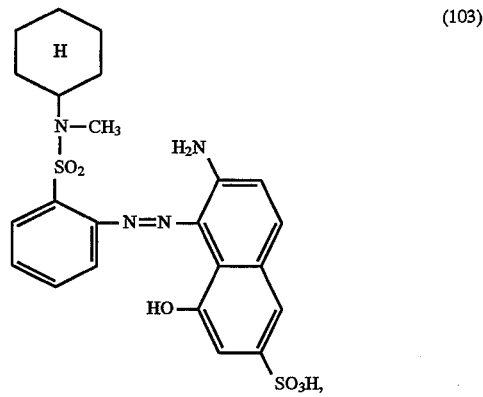 (103)

0.055 part of a dye which, in the form of the free acid, corresponds to the compound of formula

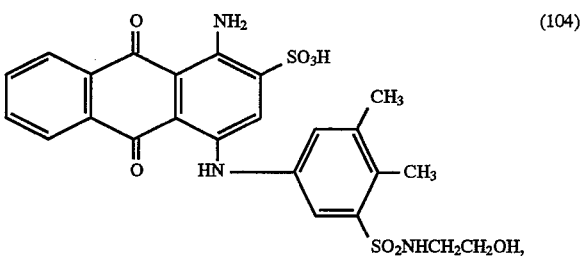 (104)

and 0.055 part of a dye which, in the form of the free acid, corresponds to the compound of formula

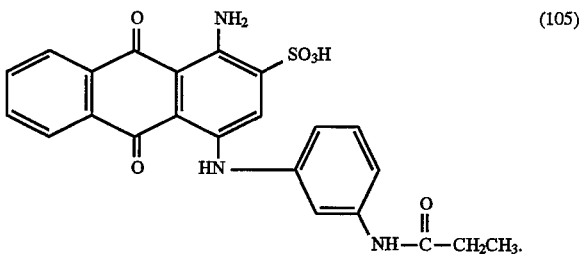 (105)

100 parts of polyamide 66 fibre material (Helanca tricot) are put into the resultant dye solution and the dyebath is heated over 45 minutes to c.96° C. The dyebath is kept at this temperature for 45 to 60 minutes and then cooled to 70° C. The dyed goods are removed from the dyebath, rinsed with water and then dried, giving a fabric dyed in a beige-brown shade.

EXAMPLES 2 TO 10

The procedure of Example 1 is repeated, but replacing the dyes of formulae (101) and (102) by the dye mixtures listed in the following Table 1, column 2, to give polyamide fabrics likewise dyed in a beige-brown shade. Each component of the dye mixtures listed in Table 1 is used in an amount of 0.11 part, based on the fibre material to be dyed.

TABLE 1

| Ex. | Mixture of yellow- or orange-dyeing dyes | |
| --- | --- | --- |
| 2 | 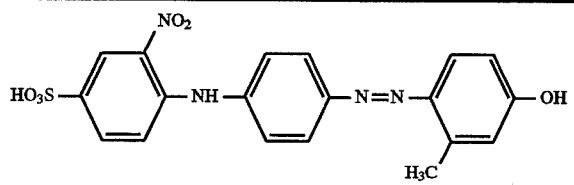 | and |
|   | 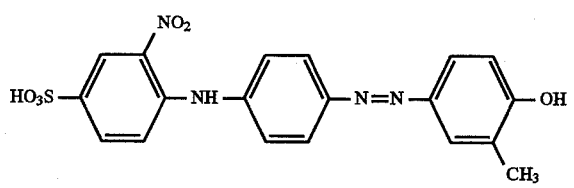 | |
| 3 | 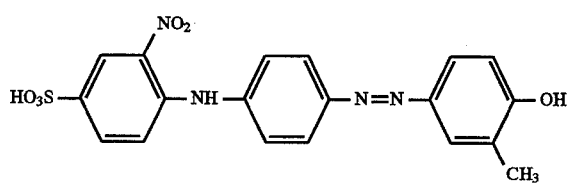 | and |
|   | 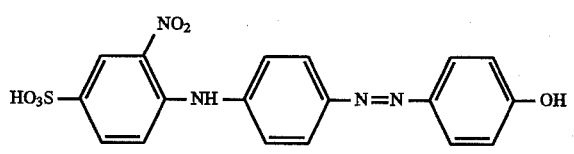 | |
| 4 | 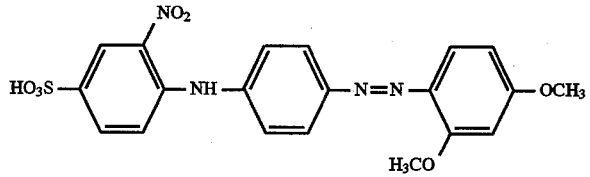 | and |
|   | 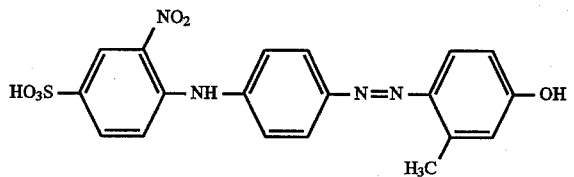 | |
| 5 | 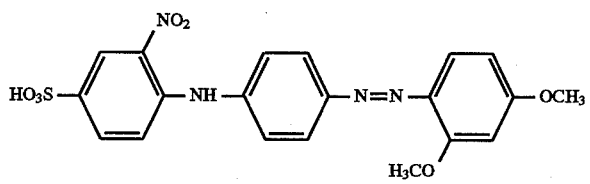 | and |
|   | 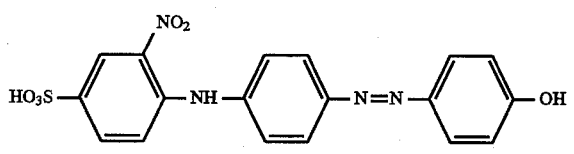 | |

TABLE 1-continued
| Ex. | Mixture of yellow- or orange-dyeing dyes | |
|---|---|---|
| 6 | 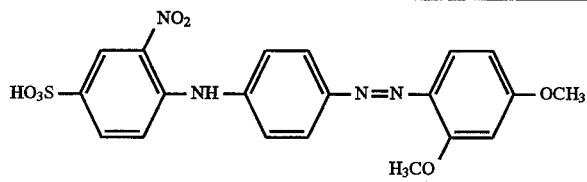 | and |
| | 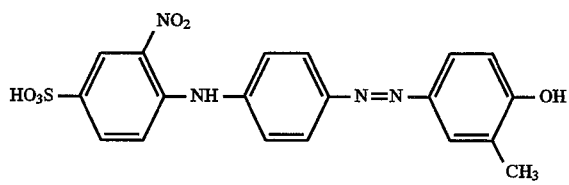 | |
| 7 | 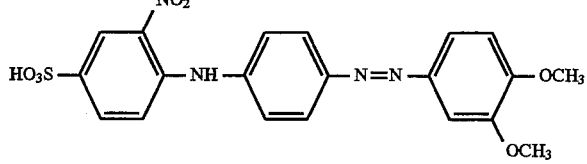 | and |
| | 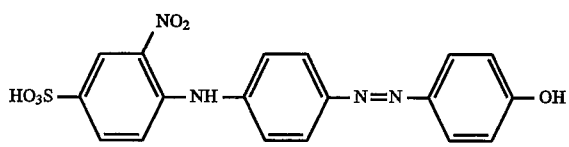 | |
| 8 | 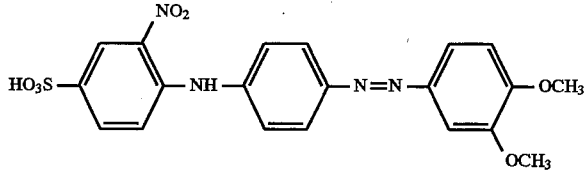 | and |
| | 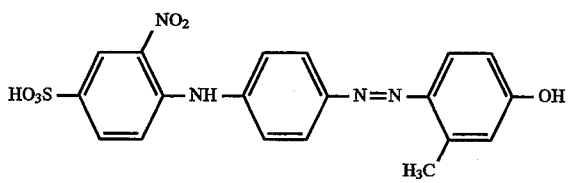 | |
| 9 | 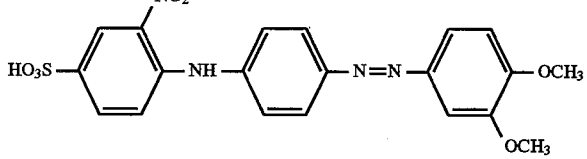 | and |
| | 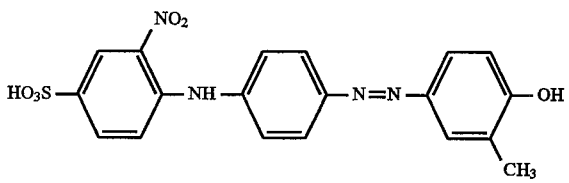 | |
| 10 | 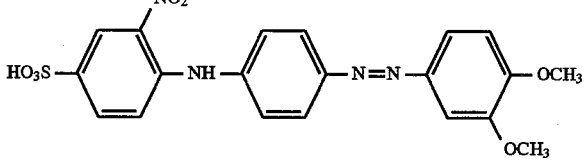 | and |

TABLE 1-continued

| Ex. | Mixture of yellow- or orange-dyeing dyes |
|---|---|
| | 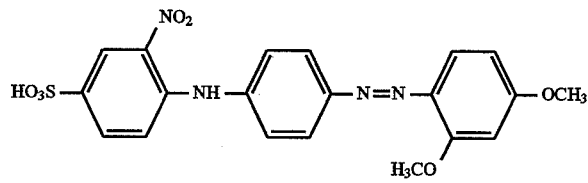 |

EXAMPLE 11 TO 15

The procedure of Example 1 is repeated, but replacing the blue-dyeing dyes of formulae (104) and (105) by one of the blue-dyeing dyes listed in the following Table 2, column 2, to give a polyamide fabric likewise dyed in a beige-brown shade. Each of the dyes listed in Table 2 is used in an amount of 0.11 part, based on the fibre material to be dyed.

TABLE 2

| Ex. | Blue-dyeing dyes | |
|---|---|---|
| 11 | 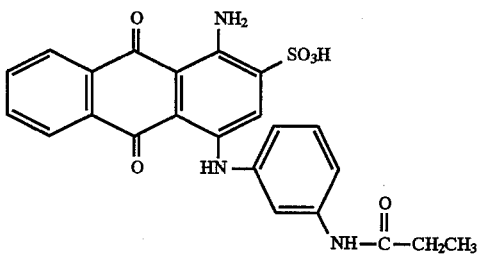 | (105) |
| 12 | 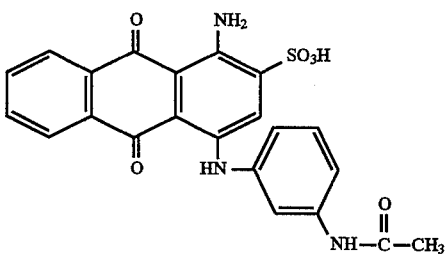 | (106) |
| 13 | 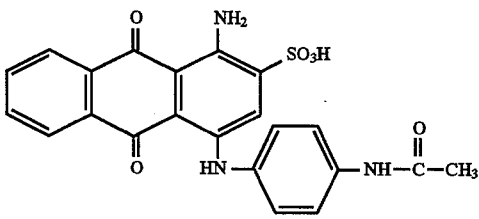 | (107) |
| 14 | 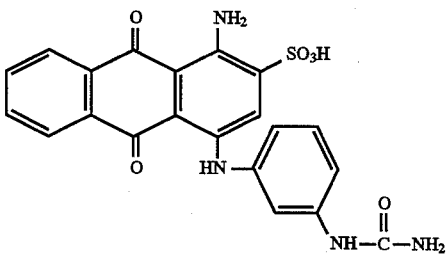 | (108) |

TABLE 2-continued

| Ex. | Blue-dyeing dyes | |
|---|---|---|
| 15 | 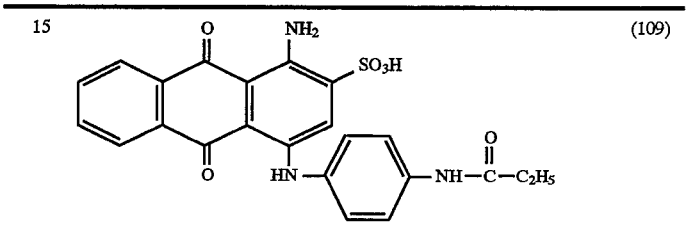 | (109) |

EXAMPLES 16 TO 26

The procedure of Example 1 is repeated, but replacing the red-dyeing dye of formula (103) with one of the red-dyeing dyes listed in the following Table 3, column 2, to give a polyamide fabric likewise dyed in a beige-brown shade. Each of the dyes listed in Table 3 is used in an amount of 0.1 part, based on the fibre material to be dyed.

TABLE 3

| Ex. | Red-dyeing dyes | |
|---|---|---|
| 16 | 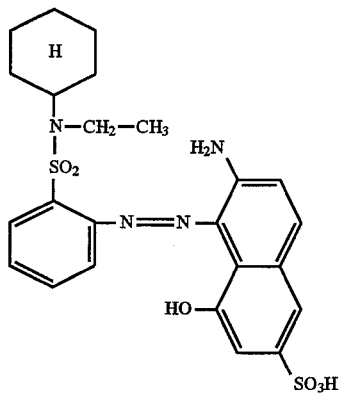 | (110) |
| 17 | 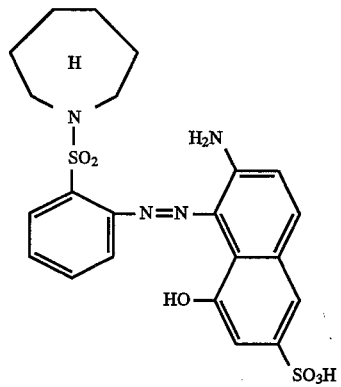 | (111) |
| 18 | 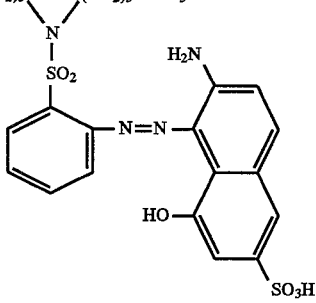 | (112) |

TABLE 3-continued
| Ex. | Red-dyeing dyes | |
|---|---|---|
| 19 | 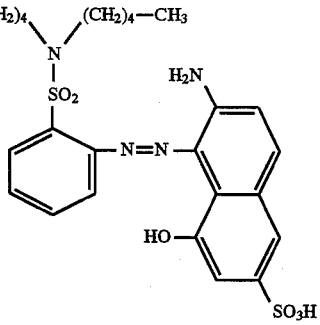 | (113) |
| 20 | 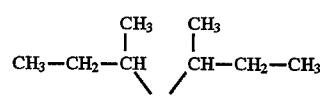 | (114) |
| 21 | 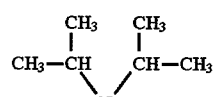 | (115) |
| 22 | 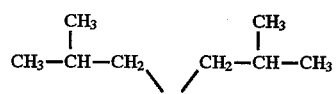 | (116) |

TABLE 3-continued

| Ex. | Red-dyeing dyes | |
|---|---|---|
| 23 | [structure of dye with cyclohexyl-N(CH(CH₃)₂)-SO₂-phenyl-N=N-naphthalene(H₂N)(OH)(SO₃H)] | (117) |
| 24 | [structure: 2-CF₃-phenyl-N=N-naphthalene(H₂N)(OH)(SO₃H)] | (118) |
| 25 | [structure: 4-Cl-2-CF₃-phenyl-N=N-naphthalene(H₂N)(OH)(SO₃H)] | (119) |
| 26 | [structure: CH₃-C(=O)-NH-phenyl(CF₃)-N=N-naphthalene(H₂N)(OH)(SO₃H)] | (120) |

EXAMPLES 27 TO 81

The procedure of Example 1 is repeated, but replacing the red-dyeing dye of formula (103) and the blue-dyeing dyes of formulae (104) and (105) by the red and blue-dyeing dyes listed in the following Table 4, to give a polyamide fabric likewise dyed in a beige-brown shade. The amounts of each of the dyes listed in Table 4 are based on the fibre material to be dyed.

TABLE 4

| Ex. | Red and blue-dyeing dyes |
|---|---|
| 27 | 0.1 part of the dye of formula (110) and |

TABLE 4-continued

| Ex. | Red and blue-dyeing dyes |
|---|---|
|    | 0.11 part of the dye of formula (105) |
| 28 | 0.1 part of the dye of formula (110) and |
|    | 0.11 part of the dye of formula (106) |
| 29 | 0.1 part of the dye of formula (110) and |
|    | 0.11 part of the dye of formula (107) |
| 30 | 0.1 part of the dye of formula (110) and |
|    | 0.11 part of the dye of formula (108) |
| 31 | 0.1 part of the dye of formula (110) and |
|    | 0.11 part of the dye of formula (109) |
| 32 | 0.1 part of the dye of formula (111) and |
|    | 0.11 part of the dye of formula (105) |
| 33 | 0.1 part of the dye of formula (111) and |

TABLE 4-continued

| Ex. | Red and blue-dyeing dyes |
|---|---|
| 34 | 0.11 part of the dye of formula (106)<br>0.1 part of the dye of formula (111) and<br>0.11 part of the dye of formula (107) |
| 35 | 0.1 part of the dye of formula (111) and<br>0.11 part of the dye of formula (108) |
| 36 | 0.1 part of the dye of formula (111) and<br>0.11 part of the dye of formula (109) |
| 37 | 0.1 part of the dye of formula (112) and<br>0.11 part of the dye of formula (105) |
| 38 | 0.1 part of the dye of formula (112) and<br>0.11 part of the dye of formula (106) |
| 39 | 0.1 part of the dye of formula (112) and<br>0.11 part of the dye of formula (107) |
| 40 | 0.1 part of the dye of formula (112) and<br>0.11 part of the dye of formula (108) |
| 41 | 0.1 part of the dye of formula (112) and<br>0.11 part of the dye of formula (109) |
| 42 | 0.1 part of the dye of formula (113) and<br>0.11 part of the dye of formula (105) |
| 43 | 0.1 part of the dye of formula (113) and<br>0.11 part of the dye of formula (106) |
| 44 | 0.1 part of the dye of formula (113) and<br>0.11 part of the dye of formula (107) |
| 45 | 0.1 part of the dye of formula (113) and<br>0.11 part of the dye of formula (108) |
| 46 | 0.1 part of the dye of formula (113) and<br>0.11 part of the dye of formula (109) |
| 47 | 0.1 part of the dye of formula (114) and<br>0.11 part of the dye of formula (105) |
| 48 | 0.1 part of the dye of formula (114) and<br>0.11 part of the dye of formula (106) |
| 49 | 0.1 part of the dye of formula (114) and<br>0.11 part of the dye of formula (107) |
| 50 | 0.1 part of the dye of formula (114) and<br>0.11 part of the dye of formula (108) |
| 51 | 0.1 part of the dye of formula (114) and<br>0.11 part of the dye of formula (109) |
| 52 | 0.1 part of the dye of formula (115) and<br>0.11 part of the dye of formula (105) |
| 53 | 0.1 part of the dye of formula (115) and<br>0.11 part of the dye of formula (106) |
| 54 | 0.1 part of the dye of formula (115) and<br>0.11 part of the dye of formula (107) |
| 55 | 0.1 part of the dye of formula (115) and<br>0.11 part of the dye of formula (108) |
| 56 | 0.1 part of the dye of formula (115) and<br>0.11 part of the dye of formula (109) |
| 57 | 0.1 part of the dye of formula (116) and<br>0.11 part of the dye of formula (105) |
| 58 | 0.1 part of the dye of formula (116) and<br>0.11 part of the dye of formula (106) |
| 59 | 0.1 part of the dye of formula (116) and<br>0.11 part of the dye of formula (107) |
| 60 | 0.1 part of the dye of formula (116) and<br>0.11 part of the dye of formula (108) |
| 61 | 0.1 part of the dye of formula (116) and<br>0.11 part of the dye of formula (109) |
| 62 | 0.1 part of the dye of formula (117) and<br>0.11 part of the dye of formula (105) |
| 63 | 0.1 part of the dye of formula (117) and<br>0.11 part of the dye of formula (106) |
| 64 | 0.1 part of the dye of formula (117) and<br>0.11 part of the dye of formula (107) |
| 65 | 0.1 part of the dye of formula (117) and<br>0.11 part of the dye of formula (108) |
| 66 | 0.1 part of the dye of formula (117) and<br>0.11 part of the dye of formula (109) |
| 67 | 0.1 part of the dye of formula (118) and<br>0.11 part of the dye of formula (105) |
| 68 | 0.1 part of the dye of formula (118) and<br>0.11 part of the dye of formula (106) |
| 69 | 0.1 part of the dye of formula (118) and<br>0.11 part of the dye of formula (107) |
| 70 | 0.1 part of the dye of formula (118) and<br>0.11 part of the dye of formula (108) |
| 71 | 0.1 part of the dye of formula (118) and<br>0.11 part of the dye of formula (109) |
| 72 | 0.1 part of the dye of formula (119) and<br>0.11 part of the dye of formula (105) |
| 73 | 0.1 part of the dye of formula (119) and<br>0.11 part of the dye of formula (106) |
| 74 | 0.1 part of the dye of formula (119) and<br>0.11 part of the dye of formula (107) |
| 75 | 0.1 part of the dye of formula (119) and<br>0.11 part of the dye of formula (108) |
| 76 | 0.1 part of the dye of formula (119) and<br>0.11 part of the dye of formula (109) |
| 77 | 0.1 part of the dye of formula (120) and<br>0.11 part of the dye of formula (105) |
| 78 | 0.1 part of the dye of formula (120) and<br>0.11 part of the dye of formula (106) |
| 79 | 0.1 part of the dye of formula (120) and<br>0.11 part of the dye of formula (107) |
| 80 | 0.1 part of the dye of formula (120) and<br>0.11 part of the dye of formula (108) |
| 81 | 0.1 part of the dye of formula (120) and<br>0.11 part of the dye of formula (109) |

EXAMPLE 82

1.3 parts of diisobutylamine are dissolved in 40 parts of acetone and to this solution is added 1 part of triethylamine. After the dropwise addition of 2.3 parts of 2-nitrobenzene-1-sulfochloride, dissolved in 10 parts of acetone, the solution is refluxed. Upon completion of the reaction, the reaction mixture is cooled to room temperature and the solvent is removed on a rotary evaporator. The residue is diluted with water and the precipitate is collected by suction filtration and washed with water. The product is dried under vacuum at 50° C., giving a compound of formula

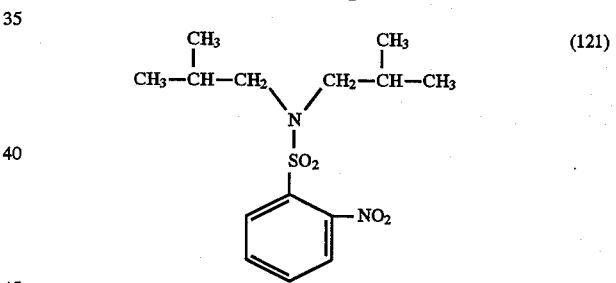

in good yield and purity.

62.4 parts of the compound of formula (121) are dissolved in 1360 parts of methanol and the solution is hydrogenated in the presence of 6.7 parts of Raney nickel at 60° C. and at a pressure of 40 bar. The Raney nickel is then filtered off and the filter product is concentrated on a rotary evaporator, giving a compound of formula

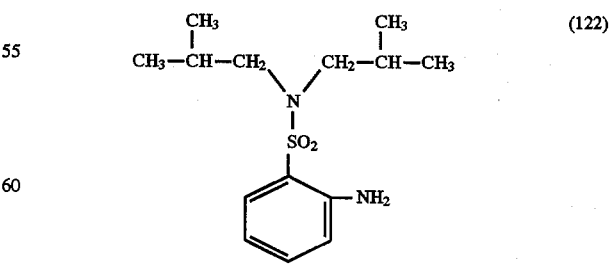

in good yield and purity.

2.8 parts of the compound of formula (122) are dissolved in 10 parts of sulfolane and the solution is then cooled to 10° C. To this solution are added 3.3 parts of nitrosylsulfuric acid (40%) and the solution is then stirred for 1 hour at 10° C. Excess nitrite is destroyed by addition of sulfamic acid. A solution containing 2.6 parts of gamma acid in 10 parts of water, adjusted to pH 7 by the addition of sodium hydroxide solution, is then added dropwise, and stirring is continued until no more diazo compound can be detected. To this solution are then added 50 parts of hydrochloric acid (32%) and a precipitate forms. The precipitate is collected by suction filtration, stirred in 200 parts of water, and the pH is adjusted to 7 with 2N sodium hydroxide solution. After addition of 3% by volume of sodium chloride, the precipitate is collected by suction filtration and dried under vacuum at 60° C., to give a dye which, in the form of the free acid, corresponds to the compound of formula

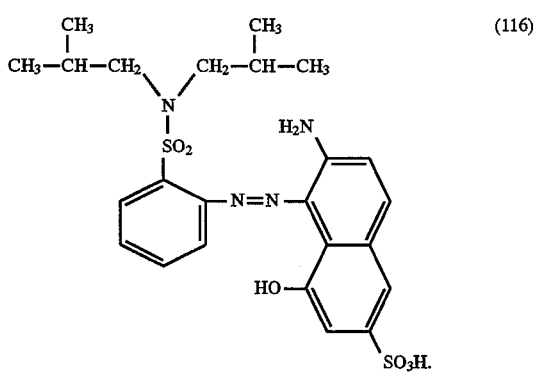
(116)

In general accordance with the procedure of Example 82, the dyes of formulae

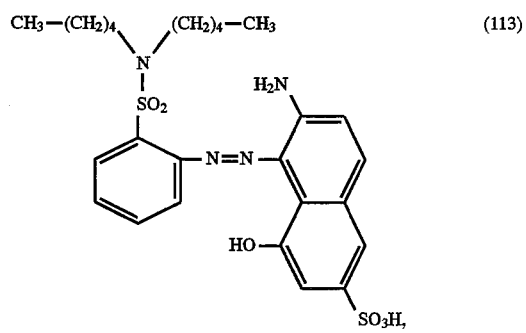
(113)

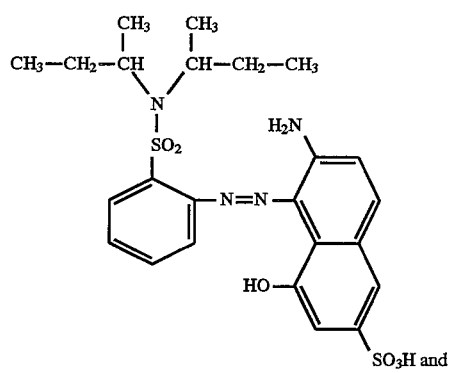
(114)

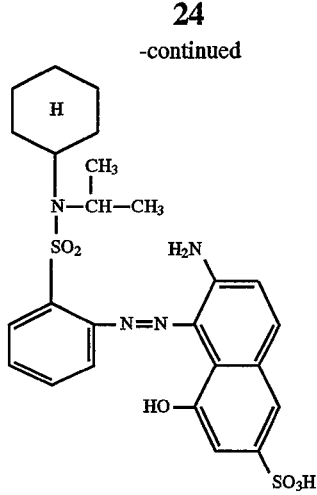
(117)

may be obtained in the form of the free acid.

What is claimed is:

1. A process for dyeing or printing natural or synthetic polyamide fibre material by the trichromatic technique, which comprises using the yellow- or orange-dyeing dye of formula (6)

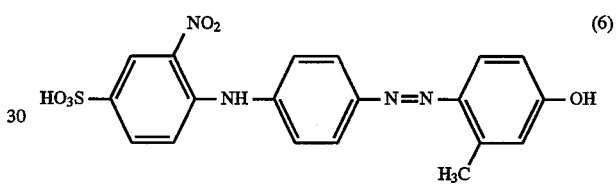
(6)

together with at least one yellow- or orange-dyeing dye of the formulae (7) and (8)

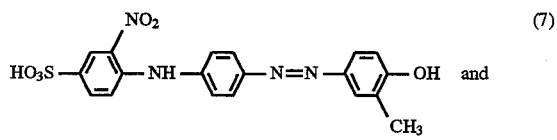
(7)

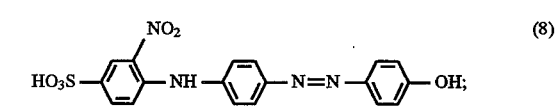
(8)

together with at least one red-dyeing dye of the formulae (2) and (3)

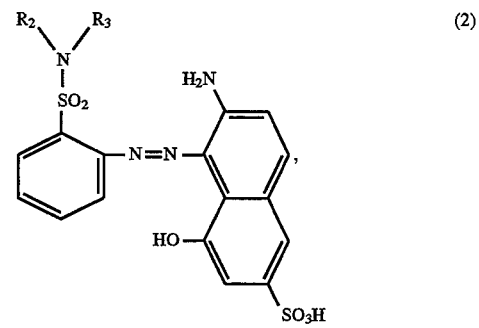
(2)

wherein $R_2$ is $C_1$–$C_6$alkyl, phenyl or cyclohexyl and $R_3$ is $C_1$–$C_6$alkyl, or wherein $R_2$ and $R_3$, together with the linking nitrogen atom, form an azepinyl ring,

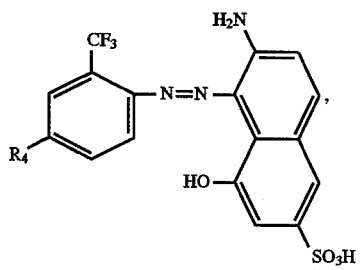

(3)

wherein $R_4$ is hydrogen, halogen or $C_2$–$C_4$alkanoylamino; and together with at least one of the blue-dyeing dyes of formulae (4) and (5)

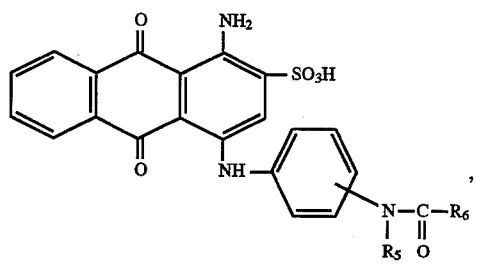

(4)

wherein $R_5$ is hydrogen or $C_1$–$C_4$alkyl, and $R_6$ is $C_1$–$C_4$alkyl or amino,

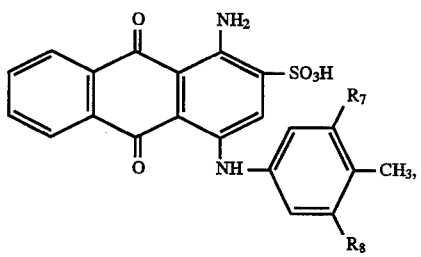

(5)

wherein $R_7$ is hydrogen or methyl, and $R_8$ is a $C_{2-4}$hydroxyalkylsulfamoyl radical.

2. A process according to claim 1, wherein the dye mixture of yellow- or orange-dyeing dyes is a mixture of the dyes of formulae

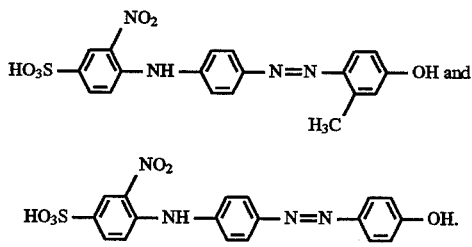

(6)

(8)

3. A process according to claim 1, wherein the red-dyeing dye is a dye of formula (2), wherein $R_2$ is cyclohexyl and $R_3$ is methyl, or $R_2$ and $R_3$, together with the linking nitrogen atom, form an azepinyl ring.

4. A process according to claim 1, wherein the blue-dyeing dye is a dye of formula (4) or a mixture of the dye of formula (4) and a dye of formula (5), wherein $R_5$ is hydrogen, $R_6$ is methyl or ethyl, and $R_8$ is a radical of formula —$SO_2$—NH—$CH_2$—$CH_2$—OH.

5. A process according to claim 1, wherein the mixture of yellow- or orange-dyeing dyes is a mixture comprising the dye of formula

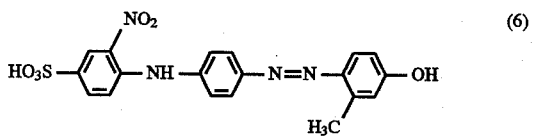

(6)

together with at least one dye of formulae

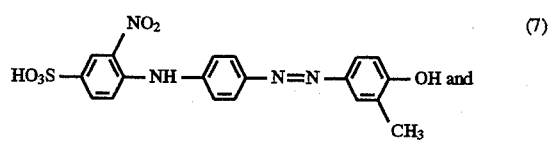

(7)

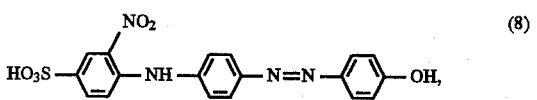

(8)

and the red-dyeing dye is a dye of formula (2), wherein $R_2$ is cyclohexyl and $R_3$ is methyl, or wherein $R_2$ and $R_3$, together with the linking nitrogen atom, form an azepinylring, and the blue-dyeing dye is a dye of formula (4) or a mixture of the dye of formula (4) and a dye of formula (5), wherein $R_5$ is hydrogen, $R_6$ is methyl or ethyl, and $R_8$ is a radical of formula —$SO_2$—NH—$CH_2$—$CH_2$—OH.

6. A process according to claim 1, wherein the red-dyeing dye is a dye of formula (2), wherein $R_2$ is cyclohexyl and $R_3$ is methyl.

7. A process according to claim 1, in which the blue-dyeing dyes are a mixture comprising the dye of formula (4) together with the dye of formula (5), wherein $R_5$ is hydrogen, $R_6$ is methyl or ethyl, $R_7$ is methyl, and $R_8$ is a radical of formula —$SO_2$—NH—$CH_2$—$CH_2$—OH.

8. A process according to claim 1, which comprises not using an additional yellow- or orange-dyeing dye besides the dyes of formula (6), (7) and (8).

9. A process according to claim 1 for dyeing or printing wool or synthetic polyamide fibre material.

10. A process according to claim 9 for dyeing or printing synthetic polyamide fibre material.

* * * * *